(12) United States Patent
Davis et al.

(10) Patent No.: US 6,965,682 B1
(45) Date of Patent: Nov. 15, 2005

(54) DATA TRANSMISSION BY WATERMARK PROXY

(76) Inventors: Bruce L. Davis, 15599 Village Dr., Lake Oswego, OR (US) 97034; William Y. Conwell, 6224 SW. Tower Way, Portland, OR (US) 97221; Geoffrey B. Rhoads, 2961 SW. Turner Rd., West Linn, OR (US) 97068; Douglas B. Evans, 474 Liberty St., San Francisco, CA (US) 94114

( * ) Notice: Subject to any disclaimer, the term of this patent is extended or adjusted under 35 U.S.C. 154(b) by 0 days.

(21) Appl. No.: 09/504,239

(22) Filed: Feb. 15, 2000

Related U.S. Application Data

(63) Continuation-in-part of application No. 09/491,534, filed on Jan. 26, 2000, now abandoned, which is a continuation-in-part of application No. 09/476,686, filed on Dec. 30, 1999, and a continuation-in-part of application No. 09/473,396, filed on Dec. 28, 1999, now Pat. No. 6,577,746.
(60) Provisional application No. 60/134,782, filed on May 19, 1999.

(51) Int. Cl.[7] .................................................. G06K 9/00
(52) U.S. Cl. ...................... 382/100; 380/287; 709/217; 713/176
(58) Field of Search ................................. 382/100, 112, 382/232, 183, 305, 306; 358/444; 707/9, 202; 713/200, 176; 380/4, 8, 54, 287; 709/217

(56) References Cited

U.S. PATENT DOCUMENTS

| | | |
|---|---|---|
| 3,493,674 A | 2/1970 | Houghton |
| 3,569,619 A | 3/1971 | Simjian ...................... 235/380 |
| 3,576,369 A | 4/1971 | Wick et al. |
| 3,585,290 A | 6/1971 | Sanford |
| 3,655,162 A | 4/1972 | Yamamoto et al. |
| 3,703,628 A | 11/1972 | Philipson, Jr. |
| 3,809,806 A | 5/1974 | Walker et al. |
| 3,838,444 A | 9/1974 | Loughlin et al. |
| 3,914,877 A | 10/1975 | Hines |
| 3,922,074 A | 11/1975 | Ikegami et al. |
| 3,971,917 A | 7/1976 | Maddox et al. |
| 3,977,785 A | 8/1976 | Harris |
| 3,982,064 A | 9/1976 | Barnaby |
| 3,984,624 A | 10/1976 | Waggener |
| 4,025,851 A | 5/1977 | Haselwood et al. |
| 4,184,700 A | 1/1980 | Greenaway |

(Continued)

FOREIGN PATENT DOCUMENTS

| | | |
|---|---|---|
| CA | 2235002 | 12/1998 |
| DE | 3806411 | 9/1989 |
| DE | 19521969 C1 | 2/1997 |
| EP | 366381 A2 | 10/1989 |
| EP | 372 601 | 6/1990 |

(Continued)

OTHER PUBLICATIONS

Piva et al., "DCT–based Watermarking Recovering without Resorting to the Uncorrupted Original Image", IEEE 1997, pp. 520–523.*

Berghel et al., "Protecting ownership rights through digital watermarking", University of Arkansas, pp. 101–103, Jul. 1996.*

(Continued)

Primary Examiner—Yon J. Couso

(57) ABSTRACT

A media object sensed at one location is delivered at a second remote location, or an application associated with the object is made available at the second location. In some embodiments, the delivered object is of a higher quality than the sensed object. In other embodiments, larger objects requiring higher bandwidth for effective transmission are delivered notwithstanding low bandwidth bottlenecks between the first and second locations. Such advantages are achieved by employing watermark data as proxies for media objects and associated applications.

36 Claims, 2 Drawing Sheets

U.S. PATENT DOCUMENTS

| | | | |
|---|---|---|---|
| 4,225,967 A | 9/1980 | Miwa et al. | |
| 4,230,990 A | 10/1980 | Lert, Jr. et al. | 725/22 |
| 4,231,113 A | 10/1980 | Blasbalg | |
| 4,238,849 A | 12/1980 | Gassmann | 370/204 |
| 4,252,995 A | 2/1981 | Schmidt et al. | |
| 4,262,329 A | 4/1981 | Bright et al. | |
| 4,296,326 A | 10/1981 | Haslop et al. | |
| 4,297,729 A | 10/1981 | Steynor et al. | |
| 4,313,197 A | 1/1982 | Maxemchuk | |
| 4,367,488 A | 1/1983 | Leventer et al. | 370/204 |
| 4,379,947 A | 4/1983 | Warner | |
| 4,389,671 A | 6/1983 | Posner et al. | |
| 4,395,600 A | 7/1983 | Lundy et al. | |
| 4,416,001 A | 11/1983 | Ackerman | |
| 4,423,415 A | 12/1983 | Goldman | |
| 4,425,642 A | 1/1984 | Moses et al. | 370/477 |
| 4,476,468 A | 10/1984 | Goldman | |
| 4,528,588 A | 7/1985 | Lofberg | |
| 4,532,508 A | 7/1985 | Ruell | |
| 4,547,804 A | 10/1985 | Greenberg | |
| 4,553,261 A | 11/1985 | Froessl | |
| 4,590,366 A | 5/1986 | Rothfjell | |
| 4,595,950 A | 6/1986 | Lofberg | |
| 4,618,257 A | 10/1986 | Bayne et al. | |
| 4,637,051 A | 1/1987 | Clark | |
| 4,639,779 A | 1/1987 | Greenberg | |
| 4,647,974 A | 3/1987 | Butler et al. | |
| 4,654,867 A | 3/1987 | Labedz et al. | |
| 4,660,221 A | 4/1987 | Dlugos | |
| 4,663,518 A | 5/1987 | Borror et al. | |
| 4,665,431 A | 5/1987 | Cooper | |
| 4,672,605 A | 6/1987 | Hustig et al. | |
| 4,675,746 A | 6/1987 | Tetrick et al. | |
| 4,677,435 A | 6/1987 | Cause D'Agraives et al. | |
| 4,682,794 A | 7/1987 | Margolin | |
| 4,703,476 A | 10/1987 | Howard | |
| 4,712,103 A | 12/1987 | Gotanda | |
| 4,718,106 A | 1/1988 | Weinblatt | |
| 4,723,149 A | 2/1988 | Harada | |
| 4,739,377 A | 4/1988 | Allen | 355/133 |
| 4,750,173 A | 6/1988 | Bluthgen | 370/528 |
| 4,765,656 A | 8/1988 | Becker et al. | |
| 4,775,901 A | 10/1988 | Nakano | |
| 4,776,013 A | 10/1988 | Kafri et al. | |
| 4,805,020 A | 2/1989 | Greenberg | |
| 4,807,031 A | 2/1989 | Broughton et al. | 348/460 |
| 4,811,357 A | 3/1989 | Betts et al. | |
| 4,811,408 A | 3/1989 | Goldman | |
| 4,820,912 A | 4/1989 | Samyn | |
| 4,835,517 A | 5/1989 | van der Gracht et al. | |
| 4,855,827 A | 8/1989 | Best | |
| 4,864,618 A | 9/1989 | Wright et al. | |
| 4,866,771 A | 9/1989 | Bain | |
| 4,874,936 A | 10/1989 | Chandler et al. | |
| 4,876,617 A | 10/1989 | Best et al. | |
| 4,879,747 A | 11/1989 | Leighton et al. | 713/186 |
| 4,884,139 A | 11/1989 | Pommier | |
| 4,885,632 A | 12/1989 | Mabey et al. | |
| 4,888,798 A | 12/1989 | Earnest | 705/54 |
| 4,903,301 A | 2/1990 | Kondo et al. | |
| 4,908,836 A | 3/1990 | Rushforth et al. | |
| 4,908,873 A | 3/1990 | Philibert et al. | 382/100 |
| 4,918,484 A | 4/1990 | Ujiie et al. | |
| 4,920,503 A | 4/1990 | Cook | |
| 4,921,278 A | 5/1990 | Shiang et al. | |
| 4,939,515 A | 7/1990 | Adelson | |
| 4,941,150 A | 7/1990 | Iwasaki | |
| 4,943,973 A | 7/1990 | Werner | |
| 4,943,976 A | 7/1990 | Ishigaki | |
| 4,944,036 A | 7/1990 | Hyatt | 367/43 |
| 4,947,028 A | 8/1990 | Gorog | 235/380 |
| 4,963,998 A | 10/1990 | Maufe | |
| 4,965,827 A | 10/1990 | McDonald | |
| 4,967,273 A | 10/1990 | Greenberg | |
| 4,969,041 A | 11/1990 | O'Grady et al. | |
| 4,972,471 A | 11/1990 | Gross et al. | |
| 4,972,475 A | 11/1990 | Sant'Anselmo | |
| 4,972,476 A | 11/1990 | Nathans | 713/186 |
| 4,977,594 A | 12/1990 | Shear | 705/53 |
| 4,979,210 A | 12/1990 | Nagata et al. | |
| 4,996,530 A | 2/1991 | Hilton | |
| 5,003,590 A | 3/1991 | Lechner et al. | |
| 5,010,405 A | 4/1991 | Schreiber et al. | |
| 5,023,907 A | 6/1991 | Johnson | 710/200 |
| 5,027,401 A | 6/1991 | Soltesz | 380/54 |
| 5,034,982 A | 7/1991 | Heninger et al. | |
| 5,036,513 A | 7/1991 | Greenblatt | |
| 5,040,059 A | 8/1991 | Leberl | |
| 5,053,956 A | 10/1991 | Donald | 713/601 |
| 5,062,666 A | 11/1991 | Mowry et al. | |
| 5,063,446 A | 11/1991 | Gibson | |
| 5,073,899 A | 12/1991 | Collier et al. | |
| 5,073,925 A | 12/1991 | Nagata et al. | |
| 5,075,773 A | 12/1991 | Pullen et al. | |
| 5,077,608 A | 12/1991 | Dubner | |
| 5,077,795 A | 12/1991 | Rourke et al. | |
| 5,079,648 A | 1/1992 | Maufe | |
| 5,091,966 A | 2/1992 | Bloomberg et al. | |
| 5,095,196 A | 3/1992 | Miyata | 235/382 |
| 5,103,459 A | 4/1992 | Gilhousen et al. | 370/206 |
| 5,113,437 A | 5/1992 | Best | |
| 5,113,445 A | 5/1992 | Wang | 380/51 |
| 5,128,525 A | 7/1992 | Stearns et al. | |
| 5,144,660 A | 9/1992 | Rose | |
| 5,146,457 A | 9/1992 | Veldhuis et al. | 370/523 |
| 5,148,498 A | 9/1992 | Resnikoff et al. | |
| 5,150,409 A | 9/1992 | Elsner | |
| 5,161,210 A | 11/1992 | Druyvesteyn et al. | |
| 5,166,676 A | 11/1992 | Milheiser | |
| 5,168,147 A | 12/1992 | Bloomberg | |
| 5,181,786 A | 1/1993 | Hujink | 400/61 |
| 5,185,736 A | 2/1993 | Tyrrell et al. | |
| 5,199,081 A | 3/1993 | Saito et al. | |
| 5,200,822 A | 4/1993 | Bronfin et al. | 725/22 |
| 5,212,551 A | 5/1993 | Conanan | |
| 5,213,337 A | 5/1993 | Sherman | 463/40 |
| 5,216,724 A | 6/1993 | Suzuki et al. | |
| 5,228,056 A | 7/1993 | Schilling | |
| 5,243,411 A | 9/1993 | Shirochi et al. | |
| 5,243,423 A | 9/1993 | DeJean et al. | |
| 5,245,165 A | 9/1993 | Zhang | |
| 5,245,329 A | 9/1993 | Gokcebay | |
| 5,247,364 A | 9/1993 | Banker et al. | |
| 5,253,078 A | 10/1993 | Balkanski et al. | |
| 5,257,119 A | 10/1993 | Funada et al. | |
| 5,259,025 A | 11/1993 | Monroe | 705/75 |
| 5,267,334 A | 11/1993 | Normille et al. | |
| 5,280,537 A | 1/1994 | Sugiyama et al. | 370/529 |
| 5,288,976 A | 2/1994 | Citron | 235/375 |
| 5,291,243 A | 3/1994 | Heckman et al. | |
| 5,293,399 A | 3/1994 | Hefti | |
| 5,295,203 A | 3/1994 | Krause et al. | 382/248 |
| 5,299,019 A | 3/1994 | Pack et al. | |
| 5,305,400 A | 4/1994 | Butera | |
| 5,315,098 A | 5/1994 | Tow | 235/494 |
| 5,319,453 A | 6/1994 | Copriviza et al. | |
| 5,319,724 A | 6/1994 | Blonstein et al. | |
| 5,319,735 A | 6/1994 | Preuss et al. | |
| 5,321,470 A | 6/1994 | Hasuo et al. | |
| 5,325,167 A | 6/1994 | Melen | |
| 5,327,237 A | 7/1994 | Gerdes et al. | |

| Patent No. | Date | Inventor | Class |
|---|---|---|---|
| 5,337,362 A | 8/1994 | Gormish et al. | |
| 5,349,655 A | 9/1994 | Mann | |
| 5,351,302 A | 9/1994 | Leighton et al. | |
| 5,371,792 A | 12/1994 | Asai et al. | |
| 5,374,976 A | 12/1994 | Spannenburg | |
| 5,379,345 A | 1/1995 | Greenberg | 455/2.01 |
| 5,387,941 A | 2/1995 | Montgomery et al. | |
| 5,394,274 A | 2/1995 | Kahn | |
| 5,396,559 A | 3/1995 | McGrew | |
| 5,398,283 A | 3/1995 | Virga | |
| 5,404,160 A | 4/1995 | Schober et al. | |
| 5,404,377 A | 4/1995 | Moses | |
| 5,408,542 A | 4/1995 | Callahan | |
| 5,416,307 A | 5/1995 | Danek et al. | |
| 5,418,853 A | 5/1995 | Kanota et al. | |
| 5,422,963 A | 6/1995 | Chen et al. | |
| 5,422,995 A | 6/1995 | Aoki et al. | |
| 5,425,100 A | 6/1995 | Thomas et al. | |
| 5,428,606 A | 6/1995 | Moskowitz | |
| 5,428,607 A | 6/1995 | Hiller et al. | 370/352 |
| 5,428,731 A | 6/1995 | Powers | 707/501.1 |
| 5,432,542 A | 7/1995 | Thibadeau et al. | |
| 5,432,870 A | 7/1995 | Schwartz | |
| 5,446,488 A | 8/1995 | Vogel | |
| 5,450,122 A | 9/1995 | Keene | |
| 5,450,490 A | 9/1995 | Jensen et al. | |
| 5,461,426 A | 10/1995 | Limberg et al. | |
| 5,463,209 A | 10/1995 | Figh | 235/383 |
| 5,469,222 A | 11/1995 | Sprague | |
| 5,469,506 A | 11/1995 | Berson et al. | 713/186 |
| 5,473,631 A | 12/1995 | Moses | |
| 5,479,168 A | 12/1995 | Johnson et al. | |
| 5,481,294 A | 1/1996 | Thomas et al. | |
| 5,486,686 A | 1/1996 | Zdybel, Jr. et al. | |
| 5,488,664 A | 1/1996 | Shamir | |
| 5,493,677 A | 2/1996 | Balogh et al. | 707/104.1 |
| 5,495,581 A | 2/1996 | Tsai | 707/526 |
| 5,496,071 A | 3/1996 | Walsh | 283/70 |
| 5,499,294 A | 3/1996 | Friedman | |
| 5,502,576 A | 3/1996 | Ramsay et al. | 358/444 |
| 5,515,081 A | 5/1996 | Vasilik | |
| 5,521,722 A | 5/1996 | Colvill et al. | |
| 5,524,933 A | 6/1996 | Kunt et al. | |
| 5,530,751 A | 6/1996 | Morris | |
| 5,530,759 A | 6/1996 | Braudaway et al. | |
| 5,530,852 A | 6/1996 | Meske, Jr. et al. | 709/206 |
| 5,532,920 A | 7/1996 | Hartrick et al. | |
| 5,537,223 A | 7/1996 | Curry | |
| 5,539,471 A | 7/1996 | Myhrvold et al. | |
| 5,539,735 A | 7/1996 | Moskowitz | |
| 5,541,662 A | 7/1996 | Adams et al. | |
| 5,544,255 A | 8/1996 | Smithies et al. | |
| 5,548,646 A | 8/1996 | Aziz et al. | |
| 5,557,333 A | 9/1996 | Jungo et al. | |
| 5,559,559 A | 9/1996 | Jungo et al. | |
| 5,568,179 A | 10/1996 | Diehl et al. | |
| 5,568,550 A | 10/1996 | Ur | |
| 5,568,570 A | 10/1996 | Rabbani | |
| 5,572,010 A | 11/1996 | Petrie | |
| 5,572,247 A | 11/1996 | Montgomery | |
| 5,576,532 A | 11/1996 | Hecht | |
| 5,579,124 A | 11/1996 | Aijala et al. | |
| 5,581,686 A | 12/1996 | Koppolu | |
| 5,581,760 A | 12/1996 | Atkinson | |
| 5,582,103 A | 12/1996 | Tanaka et al. | |
| 5,587,743 A | 12/1996 | Montgomery | |
| 5,590,197 A | 12/1996 | Chen et al. | |
| 5,592,622 A | 1/1997 | Isfeld et al. | 709/207 |
| 5,594,226 A | 1/1997 | Steger | 235/379 |
| 5,598,526 A | 1/1997 | Daniel et al. | |
| 5,602,920 A | 2/1997 | Bestler et al. | |
| 5,606,609 A * | 2/1997 | Houser et al. | 380/4 |
| 5,611,575 A | 3/1997 | Petrie | |
| 5,613,004 A | 3/1997 | Cooperman et al. | 380/28 |
| 5,613,012 A | 3/1997 | Hoffman et al. | |
| 5,614,940 A | 3/1997 | Cobbley et al. | |
| 5,617,119 A | 4/1997 | Briggs et al. | |
| 5,617,148 A | 4/1997 | Montgomery | |
| 5,629,770 A | 5/1997 | Brassil | |
| 5,629,980 A | 5/1997 | Stefik et al. | |
| 5,636,292 A | 6/1997 | Rhoads | |
| 5,638,443 A | 6/1997 | Stefik | 705/54 |
| 5,638,446 A | 6/1997 | Rubin | |
| 5,640,193 A | 6/1997 | Wellner | 725/100 |
| 5,646,999 A | 7/1997 | Saito | 705/54 |
| 5,652,626 A | 7/1997 | Kawakami et al. | |
| 5,659,164 A | 8/1997 | Schmid | 235/375 |
| 5,661,574 A | 8/1997 | Kawana | |
| 5,663,766 A | 9/1997 | Sizer, II | |
| 5,664,018 A | 9/1997 | Leighton | |
| 5,665,951 A | 9/1997 | Newman et al. | 235/375 |
| 5,666,487 A | 9/1997 | Goodman et al. | |
| 5,668,636 A | 9/1997 | Beach et al. | 358/296 |
| 5,671,282 A | 9/1997 | Wolff et al. | 713/179 |
| 5,673,316 A | 9/1997 | Auerbach et al. | 705/51 |
| 5,687,236 A * | 11/1997 | Moskowitz et al. | 380/28 |
| 5,692,073 A | 11/1997 | Cass | |
| 5,710,636 A | 1/1998 | Curry | |
| 5,717,940 A | 2/1998 | Peairs et al. | |
| 5,719,939 A | 2/1998 | Tel | |
| 5,721,788 A | 2/1998 | Powell et al. | 382/100 |
| 5,727,092 A | 3/1998 | Sandford, II et al. | |
| 5,735,547 A | 4/1998 | Morelle et al. | |
| 5,740,244 A | 4/1998 | Indeck et al. | 713/176 |
| 5,742,845 A | 4/1998 | Wagner | 395/821 |
| 5,745,604 A | 4/1998 | Rhoads | |
| 5,761,686 A | 6/1998 | Bloomberg | 707/529 |
| 5,765,152 A | 6/1998 | Erickson | 707/9 |
| 5,765,176 A | 6/1998 | Bloomberg | |
| 5,768,426 A | 6/1998 | Rhoads | 382/232 |
| 5,778,102 A | 7/1998 | Sandford, II et al. | 382/251 |
| 5,790,693 A | 8/1998 | Graves et al. | |
| 5,790,697 A | 8/1998 | Munro et al. | |
| 5,804,803 A | 9/1998 | Cragun et al. | 235/375 |
| 5,809,160 A | 9/1998 | Powell et al. | |
| 5,809,317 A | 9/1998 | Kogan | |
| 5,817,205 A | 10/1998 | Kaule | |
| 5,818,441 A | 10/1998 | Throckmorton et al. | 345/717 |
| 5,819,289 A | 10/1998 | Sanford, II et al. | |
| 5,825,871 A | 10/1998 | Mark | 379/357.03 |
| 5,825,892 A | 10/1998 | Braudaway et al. | 380/51 |
| 5,838,458 A | 11/1998 | Tsai | 358/402 |
| 5,841,978 A | 11/1998 | Rhoads | 709/217 |
| 5,848,144 A | 12/1998 | Ahrens | 379/219 |
| 5,848,413 A | 12/1998 | Wolff | 707/10 |
| 5,852,673 A | 12/1998 | Young | 382/164 |
| 5,857,038 A | 1/1999 | Owada et al. | 382/284 |
| 5,862,218 A | 1/1999 | Steinberg | |
| 5,862,260 A | 1/1999 | Rhoads | |
| 5,866,888 A * | 2/1999 | Bravman et al. | 235/375 |
| 5,869,819 A | 2/1999 | Knowles et al. | 235/375 |
| 5,871,615 A | 2/1999 | Harris | |
| 5,872,589 A | 2/1999 | Morales | 725/24 |
| 5,875,249 A * | 2/1999 | Mintzer et al. | 380/54 |
| 5,878,434 A | 3/1999 | Draper et al. | 707/202 |
| 5,892,900 A | 4/1999 | Ginter et al. | 713/200 |
| 5,893,101 A | 4/1999 | Balogh et al. | |
| 5,893,908 A | 4/1999 | Cullen et al. | |
| 5,898,779 A | 4/1999 | Squilla et al. | |
| 5,900,608 A | 5/1999 | Iida | 235/381 |
| 5,901,224 A | 5/1999 | Hecht | |
| 5,902,353 A | 5/1999 | Reber et al. | 709/219 |

| Patent No. | Date | Inventor | Class |
|---|---|---|---|
| 5,903,729 A | 5/1999 | Reber et al. | 709/219 |
| 5,905,248 A | 5/1999 | Russell et al. | 235/462.15 |
| 5,905,251 A | 5/1999 | Knowles | 235/472.01 |
| 5,905,810 A | 5/1999 | Jones et al. | |
| 5,910,987 A | 6/1999 | Ginter et al. | |
| 5,913,210 A | 6/1999 | Call | 707/4 |
| 5,915,027 A | 6/1999 | Cox et al. | 380/54 |
| 5,918,223 A * | 6/1999 | Blum et al. | |
| 5,930,767 A | 7/1999 | Reber et al. | 705/26 |
| 5,932,862 A * | 8/1999 | Hussey et al. | 235/462 |
| 5,932,863 A | 8/1999 | Rathus et al. | 235/462.15 |
| 5,933,798 A | 8/1999 | Linnartz | |
| 5,933,829 A | 8/1999 | Durst et al. | 707/10 |
| 5,938,726 A | 8/1999 | Reber et al. | 709/217 |
| 5,938,727 A | 8/1999 | Ikeda | 709/218 |
| 5,939,695 A | 8/1999 | Nelson | 235/383 |
| 5,940,595 A | 8/1999 | Reber et al. | 709/227 |
| 5,943,422 A | 8/1999 | Van Wie et al. | 705/54 |
| 5,946,414 A | 8/1999 | Cass et al. | 382/183 |
| 5,949,055 A | 9/1999 | Fleet et al. | |
| 5,949,885 A | 9/1999 | Leighton | 380/54 |
| 5,950,173 A | 9/1999 | Perkowski | 705/26 |
| 5,963,916 A | 10/1999 | Kaplan | 705/26 |
| 5,971,277 A | 10/1999 | Cragun et al. | 235/462.01 |
| 5,974,141 A | 10/1999 | Saito | 705/52 |
| 5,974,548 A | 10/1999 | Adams | 713/200 |
| 5,978,477 A | 11/1999 | Hull et al. | |
| 5,978,773 A | 11/1999 | Hudetz et al. | 705/23 |
| 5,979,757 A | 11/1999 | Tracy et al. | 235/383 |
| 5,981,223 A | 11/1999 | Sathe et al. | |
| 5,983,218 A | 11/1999 | Syeda-Mahmood | 707/3 |
| 5,991,426 A | 11/1999 | Cox et al. | |
| 5,995,978 A | 11/1999 | Cullen et al. | |
| 6,005,501 A | 12/1999 | Wolosewicz | 341/52 |
| 6,006,226 A | 12/1999 | Cullen et al. | |
| 6,024,287 A | 2/2000 | Takai et al. | |
| 6,035,177 A | 3/2000 | Moses et al. | 725/22 |
| 6,052,486 A | 4/2000 | Knowlton et al. | 382/232 |
| 6,064,764 A | 5/2000 | Bhaskaran et al. | |
| 6,085,205 A | 7/2000 | Peairs et al. | |
| 6,122,403 A | 9/2000 | Rhoads | 382/233 |
| 6,166,750 A | 12/2000 | Negishi | |
| 6,182,090 B1 | 1/2001 | Peairs | |
| 6,188,787 B1 | 2/2001 | Ohmae et al. | |
| 6,199,073 B1 | 3/2001 | Peairs et al. | |
| 6,243,480 B1 | 6/2001 | Zhao et al. | |
| 6,252,963 B1 | 6/2001 | Rhoads | |
| 6,266,430 B1 | 7/2001 | Rhoads et al. | 382/100 |
| 6,286,036 B1 | 9/2001 | Rhoads | 382/100 |
| 6,301,360 B1 | 10/2001 | Bocionek et al. | |
| 6,311,214 B1 | 10/2001 | Rhoads | 709/217 |
| 6,314,457 B1 | 11/2001 | Schena et al. | |
| 6,321,648 B1 | 11/2001 | Berson et al. | |
| 6,321,981 B1 | 11/2001 | Ray et al. | |
| 6,324,573 B1 | 11/2001 | Rhoads | 709/218 |
| 6,334,721 B1 | 1/2002 | Horigane | 382/100 |
| 6,343,138 B1 | 1/2002 | Rhoads | |
| 6,343,204 B1 | 1/2002 | Yang | |
| 6,345,104 B1 | 2/2002 | Rhoads | |
| 6,351,815 B1 | 2/2002 | Adams | 713/200 |
| 6,359,985 B1 | 3/2002 | Koch et al. | |
| 6,389,055 B1 | 5/2002 | August et al. | |
| 6,427,020 B1 | 7/2002 | Rhoads | |
| 6,427,140 B1 | 7/2002 | Ginter et al. | |
| 6,439,465 B1 | 8/2002 | Bloomberg | |
| 6,449,377 B1 | 9/2002 | Rhoads | |
| 6,466,329 B1 | 10/2002 | Mukai | |
| 6,484,198 B1 | 11/2002 | Milovanovic et al. | |
| 6,505,160 B1 | 1/2003 | Levy et al. | |
| 6,512,837 B1 | 1/2003 | Ahmed | |
| 6,522,770 B1 | 2/2003 | Seder et al. | |
| 6,522,771 B2 | 2/2003 | Rhoads | |
| 6,549,638 B2 | 4/2003 | Davis et al. | |
| 6,574,350 B1 | 6/2003 | Rhoads et al. | |
| 6,577,746 B1 | 6/2003 | Evans et al. | |
| 6,580,819 B1 | 6/2003 | Rhoads | |
| 6,738,491 B1 | 5/2004 | Ikenoue et al. | |
| 6,786,397 B2 | 9/2004 | Silverbrook et al. | |
| 6,834,308 B1 | 12/2004 | Ikezoye et al. | |
| 2001/0016852 A1 | 8/2001 | Peairs et al. | |
| 2001/0017709 A1 | 8/2001 | Murakami et al. | |
| 2001/0022667 A1 | 9/2001 | Yoda | |
| 2001/0024510 A1 | 9/2001 | Iwamura | |
| 2001/0026377 A1 | 10/2001 | Ikegami | |
| 2001/0026629 A1 | 10/2001 | Oki | |
| 2001/0028725 A1 | 10/2001 | Nakagawa et al. | |
| 2001/0028727 A1 | 10/2001 | Naito et al. | |
| 2001/0030759 A1 | 10/2001 | Hayashi et al. | |
| 2001/0031066 A1 | 10/2001 | Meyer et al. | 382/100 |
| 2001/0043362 A1 | 11/2001 | Hull et al. | |
| 2001/0053299 A1 | 12/2001 | Matsunoshita et al. | |
| 2002/0001095 A1 | 1/2002 | Kawakami et al. | |
| 2002/0003891 A1 | 1/2002 | Hoshino | |
| 2002/0009208 A1 | 1/2002 | Alattar et al. | |
| 2002/0010684 A1 | 1/2002 | Moskowitz | |
| 2002/0018228 A1 | 2/2002 | Torigoe | |
| 2002/0023148 A1 | 2/2002 | Ritz et al. | |
| 2002/0037091 A1 | 3/2002 | Terasaki | |
| 2002/0051237 A1 | 5/2002 | Ohara | |
| 2002/0059384 A1 | 5/2002 | Kaars | |
| 2002/0071556 A1 | 6/2002 | Moskowitz | |
| 2002/0075298 A1 | 6/2002 | Schena et al. | |
| 2002/0080396 A1 | 6/2002 | Silverbrook et al. | |
| 2002/0120515 A1 | 8/2002 | Morimoto | |
| 2002/0165793 A1 | 11/2002 | Brand et al. | |
| 2003/0069852 A1 | 4/2003 | Martin | |
| 2003/0069853 A1 | 4/2003 | Bryant | |
| 2004/0148408 A1 | 7/2004 | Nadarajah | |

FOREIGN PATENT DOCUMENTS

| | | |
|---|---|---|
| EP | 411 232 | 2/1991 |
| EP | 418 964 A1 | 3/1991 |
| EP | 441 702 | 8/1991 |
| EP | 493 091 | 7/1992 |
| EP | 058 482 | 8/1992 |
| EP | 551 016 | 7/1993 |
| EP | 581 317 | 2/1994 |
| EP | 605 208 | 7/1994 |
| EP | 649 074 | 4/1995 |
| EP | 642 060 | 8/1995 |
| EP | 705 025 | 4/1996 |
| EP | 711061 | 5/1996 |
| EP | 0789480 | 8/1997 |
| EP | 789 480 | 8/1997 |
| EP | 872995 | 10/1998 |
| EP | 0642060 B1 | 4/1999 |
| EP | 975 147 | 1/2000 |
| EP | 975147 | 1/2000 |
| EP | 1122939 | 8/2001 |
| GB | 2063018 | 5/1981 |
| GB | 2067871 | 7/1981 |
| GB | 2196167 | 4/1988 |
| GB | 2204984 | 11/1988 |
| JP | 4-248771 | 2/1992 |
| JP | 5/242217 | 9/1993 |
| JP | 8-30759 | 2/1996 |
| JP | 08-50598 | 2/1996 |
| WO | WO 89/08915 | 9/1989 |
| WO | WO 93/25038 | 12/1993 |
| WO | WO94/27228 | 11/1994 |
| WO | WO95/04665 | 2/1995 |
| WO | WO95/10813 | 4/1995 |

| | | | |
|---|---|---|---|
| WO | WO 95/10835 | 4/1995 | |
| WO | WO 95/14289 | 5/1995 | |
| WO | WO 95/20291 | 7/1995 | |
| WO | WO 96/26494 | 8/1996 | |
| WO | WO 96/27259 | 9/1996 | |
| WO | WO97/43736 | 11/1997 | |
| WO | WO98/14887 | 4/1998 | |
| WO | WO98/20642 | 5/1998 | |
| WO | WO98/24050 | 6/1998 | |
| WO | WO98/40823 | 9/1998 | |
| WO | WO98/49813 | 11/1998 | |
| WO | WO99/34277 | 7/1999 | |
| WO | WO99/36876 | 7/1999 | ................ 382/100 |
| WO | WO00/44131 | 7/2000 | |
| WO | WO 01/08405 | 2/2001 | |
| WO | WO 01/80169 | 10/2001 | ................ 382/100 |

OTHER PUBLICATIONS

Bloomberg, "Embedding Digital Data on Paper in Iconic Text" SPIE vol. 3027, Document Recognition IV, pp. 67–80 (1997).

Johnson, et al., "Bridging the Paper and Electronic Worlds: The Paper User Interface", Interchi '93, pp. 507–512, Apr. 1993.

Newman, William, et al. "A Desk Supporting Computer–Based Interaction with paper Documents," ACM Conference on Human Factors in Computing Systems (CHI '92) May 3–7, 1992, pp. 587–592.

Rao, et al. "Protofoil: Storing and Finding the Information Worker's Paper Documents in an Electronic File Cabinet," Human Factors in Computing Systems (CHI '94), pp. 180–186, Boston, MA, Apr. 1994.

van Schyndel et al., "A Digital Watermark," IEEE International Conference on Image Processing, Nov. 13–16, 1994, pp. 86–90.

Whittaker, et al., "Back to the Future: Pen and Paper Technology Supports Complex Group Coordination," CHI '95, Conference on Human Factors in Computing Systems, Denver, Colorado (May 7–11, 1995) (text copy obtained from ACM).

U.S. Appl. No. 60/071,983, Levy, filed Jan. 20, 1998.
U.S. Appl. No. 60/114,725, Levy, filed Dec. 31, 1998.
U.S. Appl. No. 60/116,641, Cookson, filed Jan. 21, 1999.
U.S. Appl. No. 60/198,138, Alattar, filed Apr. 17, 2000.
U.S. Appl. No. 09/185,380, filed Nov. 3, 1998, Davis et al.
U.S. Appl. No. 09/234,780, filed Jan. 20, 1999, Rhoads et al.
U.S. Appl. No. 09/404,291, filed Sep. 23, 1999, Levy.
U.S. Appl. No. 09/428,359, filed Oct. 28, 2000, Davis et al.
U.S. Appl. No. 09/465,418, filed Dec. 16, 1999, Rhoads et al.
U.S. Appl. No. 09/478,713, filed Jan. 6, 2000, Cookson.
U.S. Appl. No. 09/504,239, filed Feb. 15, 2000, Davis et al.
U.S. Appl. No. 09/562,524, filed May 1, 2000, Carr et al.
U.S. Appl. No. 09/574,726, filed May 18, 2000, Rhoads et al.
U.S. Appl. No. 09/625,577, filed Jul. 25, 2000, Carr et al.
U.S. Appl. No. 09/645,779, filed Aug. 24, 2000, Tian et al.
U.S. Appl. No. 09/689,250, filed Oct. 11, 2000, Brunk.
U.S. Appl. No. 09/689,293, filed Oct. 11, 2000, Tian et al.
U.S. Appl. No. 09/761,349, filed Jan. 16, 2001, Rhoads.
U.S. Appl. No. 09/765,102, filed Jan. 17, 2002, Shaw.

"Access Control and COpyright Protection for Images, WorkPackage 8: Watermarking," Jun. 30, 1995, 46 pages.

"Access Control and COpyright Protection for Images, WorkPackage 3: Evaluation of Existing Systems," Apr. 19, 1995, 68 pages.

"Access Control and COpyright Protection for Images, WorkPackage 1: Access Control and Copyright Protection for Images Need Evaluation," Jun., 1995, 21 pages.

"Access Control and COpyright Protection for Images, Conditional Access and Copyright Protection Based on the Use of Trusted Third Parties," 1995, 43 pages.

Arachelian, "White Noise Storm," Apr. 11, 1994, Internet reference, 13 pages.

Arazi, et al., "Intuition, Perception, and Secure Communication," IEEE Transactionson Systems, Man, and Cybernetics, vol. 19, No. 5, Sep./Oct. 1989, pp. 1016–1020.

Arthur, "Digital Fingerprints Protect Artwork," New Scientist, Nov. 12, 1994, p. 24.

Aura, "Invisible Communication," Helskinki University of Technology, Digital Systems Laboratory, Nov. 5, 1995, 13 pages.

Bender et al, "Techniques for Data Hiding," Draft Preprint, Private Correspondence, dated Oct. 30, 1995.

Bender et al., "Techniques for Data Hiding," Massachusetts Institute of Technology, Media Laboratory, Jan. 1995, 10 pages.

Boneh, "Collusion–Secure Fingerprinting for Digital Data," Department of Computer Science, Princeton University, 1995, 31 pages.

Boney et al., "Digital Watermarks for Audio Signals," Proceedings of Multimedia '96, 1996 IEEE, pp. 473–480.

Boucqueau et al., Equitable Conditional Access and Copyright Protection for Image Based on Trusted Third Parties, Teleservices & Multimedia Communications, 2nd Int. Cost 237 Workshop, Second International Cost 237 Workshop, Nov., 1995; published 1996, pp. 229–243.

Brassil et al., "Hiding Information in Document Images," Nov., 1995, 7 pages.

Brown, "S–Tools for Windows, Version 1.00, .COPYRGT. 1994 Andy Brown, What is Steganography," Internet reference, Mar. 6, 1994, 6 pages.

Bruyndonckx et al., Neural Network Post–Processing of Coded Images Using Perceptual Masking, 1994, 3 pages.

Bruyndonckx et al., "Spatial Method for Copyright Labeling of Digital Images," 1994, 6 pages.

Burgett et al., "A Novel Method for Copyright Labeling Digitized Image Data," requested by e–mail from author (unavailable/passwork protected on IGD WWW site); 12 pages.

Caronni, "Assuring Ownership Rights for Digital Images," Published in the Proceedings of Reliable IT Systems, VIS '95, HH. Bruggemann and W. Gerhardt–Hackl (Ed.), Vieweg Publishing Company, Germany, 1995, Jun. 14, 1994, 10 pages.

Caruso, "Digital Commerce, 2 plans for watermarks, which can bind proof of authorship to electronic works." New York Times, Aug. 7, 1995, one page.

Castro et al., "Registration of Translated and Rotated Images Using Finite Fourier Transforms," IEEE Transactions on Pattern Analysis and Machine Intelligence, vol. PAMI–9, No. 5, Sep. 1987, pp. 700–703.

Choudhury, et al., "Copyright Protection for Electronic Publishing over Computer Networks," IEEE Network Magazine, Jun. 1994, 18 pages.

Clarke, "Invisible Code Tags Electronic Images," Electronic Engineering Times, Jun. 12, 1995, n. 852, p. 42.

"Copyright Protection for Digital Images, Digital Fingerprinting from FBI," Highwater FBI brochure, 1995, 4 pages.

"The Copyright Can of Worms Opened Up By The New Electronic Media," Computergram Internations, pCGN07170006, Jul. 17, 1995 and "The Copyright Can of Worms Opened Up By the New Electronic Media–2," Computergram Internations, pCGN07210008, Jul. 21, 1995, 3 pages total.

Cox et al., "Secure Spread Spectrum Watermarking for Multimedia," NEC Research Institute Technical Report, Dec. 5, 1995, 33 pages.

Cox et al., "A Secure, Imperceptable Yet Perceptually Salient, Spread Spectrum Watermark for Multimedia," IEEE, Southcon/96, Conference Record, pp. 192–197, 1996.

"Cyphertech Systems: Introduces Digital Encoding Device to Prevent TV Piracy," Hollywood Reporter, Oct. 20, 1993, p. 23.

Delaigle et al., "Digital Watermarking," Proc. SPIE–Int. Soc. Opt. Eng., vol. 2659, pp. 99–110, 1996.

Delaigle et al., "A Psychovisual Approach for Digital Picture Watermarking," 1995, 20 pages.

DICE Digital Watermark System, Q&A, Dec., 1995, 12 pages.

Digimarc presentation at RSA Conference, approximately Jan. 17, 1996, 4 pages.

Fimmerstad, "The Virtual Art Museum," Ericsson Connexion, Dec., 1995, pp. 29–31.

Fitzgerald, "Invisible Digital Copyright ID," Editor & Publisher, Jun. 25, 1994, p. 62.

"Foiling Card Forgers With Magnetic 'Noise,'" Wall Street Journal, Feb. 8, 1994.

Frequently Asked Questions About Digimarc Signature Technology, Aug. 1, 1995, HTTP://WWW.DIGIMARC.COM, 9 pages.

Friedman, "The Trustworthy Digital Camera: Restoring Credibility to the Photographic Image," IEEE Transactions on Consumer Electronics, vol. 39, No. 4, Nov., 1993, pp. 905–910.

Gabor, et al., "Theory of Communication," J. Inst. Elect. Eng. 93, 1946, pp. 429–441.

Hartung et al., Digital Watermarking of Raw and Compressed Video, Proc. SPIE 2952, Digital Compression Technologies and Systems for Video Communications, Oct., 1996, pp 205–213.

Hecht, "Embedded Data Glyph Technology for Hardcopy Digital Documents," SPIE vol. 2171, Feb. 1994, pp. 341–352.

"Holographic signatures for digital images," The Seybold Report on Desktop Publishing, Aug. 1995, one page.

Humphrey, "Stamping Out Crime," Hollywood Reporter, Jan. 26, 1994, p. S48.

dJain, "Image Coding Via a Nearest Neighbors Image Model," IEEE Transactions on Communications, vol. COM–23, No. 3, Mar. 1975, pp. 318–331.

Johnson, "Steganography," Dec. 10, 1995, 32 pages.

JPEG Group's JPEG Software (release 4), FTP.CSU-A.BEREKELEY.EDU/PUB/CYPHERPUNKS/APPLICA-TIONS/JSTEG/JPEG.ANNOUNCEMENT.GZ.

Kassam, Signal Detection in Non–Gaussian Noise, Dowden & Culver, 1988, pp. 1–96.

Koch et al., "Digital Copyright Labeling: Providing Evidence of Misuse and Tracking Unauthorized Distribution of Copyrighted Materials," Oasis Magazine, Dec. 1995, 3 pages.

Luc, "Analysis of Spread Spectrum System Parameters for Design of Hidden Transmission," Radioengineering, vol. 4, No. 2, Jun. 1995, pp. 26–29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944–957.

Matthews, "When Seeing is Not Believing," New Scientist, Oct. 16, 1993, pp. 13–15.

Matsui et al., "Video–Steganography: How to Secretly Embed a Signature in a Picture," IMA Intellectual Property Project Proceedings, Jan. 1994, vol. 1, Issue 1, pp. 187–205.

Mintzer et al., "Toward on–line, Worldwide Access to Vatican Library Materials," IBM J. Res. Develop. vol. 40 No. 2, Mar., 1996, pp. 139–162.

Moller, et al., "Rechnergestutzte Steganographie: Wie sie Funktioniert und warum folglich jede Reglementierung von Verschlusselung unsinnig ist," DuD, Datenschutz und Datensicherung, Jun. 18, 1994 318–326.

"NAB—Cyphertech Starts Anti–Piracy Broadcast Tests," Newsbytes, NEW03230023, Mar. 23, 1994.

Nakamura et al., "A Unified Coding Method of Image and Text Data Using Discrete Orthogonal Transform," Systems and Computers in Japan, vol. 21, No. 3, 1990, pp. 87–92.

Nakamura et al., "A Unified Coding Method of Dithered Image and Text Data Using Micropatterns," Electronics and Communications in Japan, Part 1, vol. 72, No. 4, 1989, pp. 50–56.

New Product Information, "FBI at AppleExpo" (Olympia, London), Nov., 1995, 2 pages.

Ohnishi et al., Embedding a Seal into a Picture Under Orthogonal Wavelet Transform, Proceedings of Multimedia '96, 1996, IEEE, pp. 514–421.

ORunaidh et al, "Watermarking Digital Images for Copyright Protection," http://www.kalman.mee.tcd.ie/people/jjr/eva.sub.—pap.html, Feb. 2, 1996, 8 pages. (Also published Aug., 1996, IEE Proceedings–Vision, Image and Signal Processing, vol. 143, No. 4, pp. 250–256.).

Pennebaker et al., JPEG Still Image Data Compression Standard, Chapter 3, "Aspects of the Human Visual System," pp. 23–27, 1993, Van Nostrand Reinhold, New York.

Pickholtz et al., "Theory of Spread–Spectrum Communications—A Tutorial," Transactions on Communications, vol. COM–30, No. 5, May, 1982, pp. 855–884.

Pitas et al., "Applying Signatures on Digital Images," IEEE Workshop on Nonlinear Image and Signal Processing, Neos Marmaras, Greece, pp. 460–463, Jun., 1995.

Port, "Halting Highway Robbery on the Internet," Business Week, Oct. 17, 1994, p. 212.

Roberts, "Picture Coding Using Pseudorandom Noise," IRE Trans. on Information Theory, vol. 8, No. 2, Feb., 1962, pp. 145–154.

Sapwater et al., "Electronic Copyright Protection," Photo>Electronic Imaging, vol. 37, No. 6, 1994, pp. 16–21.

Schneier, "Digital Signatures, Cryptographic Algorithms Can Create Nonforgeable Signatures for Electronic Documents, Making Them Valid Legal Instruments" BYTE, Nov. 1993, pp. 309–312.

shaggy@phantom.com, "Hide and Seek v. 4.0," Internet reference, Apr. 10, 1994, 3 pages.

Short, "Steps Toward Unmasking Secure Communications," International Journal of Bifurcation and Chaos, vol. 4, No. 4, 1994, pp. 959–977.

Simmons, "Subliminal Channels; Past and Present," ETT, vol. 5, No. 4, Jul.–Aug. 1994, pp. 45–59.

Sheng et al., "Experiments on Pattern Recognition Using Invariant Fourier–Mellin Descriptors," Journal of Optical Society of America, vol. 3, No. 6, Jun. 1986, pp. 771–776.

Sklar, "A Structured Overview of Digital Communications—a Tutorial Review—Part I," IEEE Communications Magazine, Aug., 1983, pp. 1–17.

Sklar, "A Structured Overview of Digital Communications—a Tutorial Review—Part II," IEEE Communications Magazine, Oct., 1983, pp. 6–21.

"Steganography," Intellectual Property and the National Information Infrastructure The Report of the Working Group on Intellectual Property Rights, Sep. 1995, pp. 212–213.

Tanaka et al., "Embedding Secret Information Into a Dithered Multi–Level Image," Proc. IEEE Military Comm. Conf., Sep. 1990, pp. 216–220.

Tanaka, "Embedding the Attribute Information Into a Dithered Image," Systems and Computers in Japan, vol. 21, No. 7, 1990, pp. 43–50.

Tirkel et al., "A Two–Dimensional Digital Watermark," 1995, 6 pages.

Toga et al., "Registration Revisited," Journal of Neuroscience Methods, 48 (1993), pp. 1–13.

van Schyndel et al., "Towards a Robust Digital Watermark," ACCV '95, vol. 2, Dec., 1995, pp. 504–508.

Wagner, "Fingerprinting," 1983 IEEE, pp. 18–22.

Walton, "Image Authentication for a Slippery New Age," Dr. Dobb's Journal, Apr. 1995, pp. 18–26, 82–87.

"Watermarking & Digital Signature: Protect Your Work!" Published on Internet 1996, http://Itswww.epfl.ch/.about.jordan/watermarking.html.

Wise, "The History of Copyright, Photographers' Rights Span Three Centuries," Photo>Electronic Imaging, vol. 37, No. 6, 1994.

van Schyndel et al., "A Digital Watermark," IEEE International Conference on Image Processing, Nov. 13–16, 1994, pp. 86–90.

Zhao et al., "Embedding Robust Labels Into Images for Copyright Protection," Proc. of the International Congress on Intellectual Property Rights for Specialized Information, Knowledge and New Technologies (Vienna, Austria) Aug. 21–25, 1995, 10 pages.

Bender, "Applications for Data Hiding," IBM Systems Journal, vol. 39, No. 3–4, pp. 547–568, 2000.

Gruhl et al., "Information Hiding to Foil the Casual Counterfeiter," Proc. 2d Information Hiding Workshop, LNCS vol. 1525, pp. 1–15 (Apr. 15, 1998).

U.S. Appl. No. 60/178,028, Rhoads et al., Jan. 26, 2000.

Zhap, "A WWW Service to Embed and Prove Digital Copyright Watermarks," Fraunhofer Institute for Computer Graphics, Proc. of EU Conf. on Multimedia Applications, Services and Techniques, May 1996, 15 pages.

U.S. Appl. No. 09/765,102, filed Jan. 17, 2001, Shaw.
U.S. Appl. No. 09/761,280, filed Jan. 16, 2001, Rhoads.
U.S. Appl. No. 09/689,226, filed Oct. 11, 2000, Brunk.
U.S. Appl. No. 09/689,250, filed Oct. 11, 2000, Ahmed.
U.S. Appl. No. 09/498,223, filed Feb. 3, 2000, Rhoads et al.
U.S. Appl. No. 09/431,990, filed Nov. 3, 1999, Rhoads.
U.S. Appl. No. 09/342,972, filed Jun. 29, 1999, Rhoads.
U.S. Appl. No. 09/293,602, filed Apr. 15, 1999, Rhoads.
U.S. Appl. No. 09/293,601, filed Apr. 15, 1999, Rhoads.
U.S. Appl. No. 09/287,940, filed Apr. 7, 1999, Rhoads.
U.S. Appl. No. 09/074,034, filed May 6, 1998, Rhoads.
U.S. Appl. No. 09/127,502, filed Jul. 31, 1998, Rhoads.
U.S. Appl. No. 60/082,228, Rhoads, filed Apr. 16, 1998.

Audio Watermarking Architectures for Secure Digital Music Distribution, A Proposal to the SDMI Portable Devices Working Group by ARIS Technologies, Inc, Mar. 26, 1999, pp. 1–11.

Audio Watermarking Architectures for Persistent Protection, Presentation to SDMI PDWG, Mar. 29, 1999, J. Winograd, Aris Technologies, pp 1–16.

Audio Watermarking System to Screen Digital Audio Content for LCM Acceptance, A Proposal Submitted in Response to PDWG99050504–Transition CfP by ARIS Technologies, Inc., May 23, 1999, Document Version 1.0, 15 pages.

Boland et al., "Watermarking Digital Images for Copyright Protection", Fifth Int'l.Conference on Image Processing and it's Application, Jul. 1995, pp. 326–330.

Levy, "AIPL's Proposal for SDMI: An Underlying Security System" (slide presentation), Mar. 29, 1999, 23 slides.

Microsoft Response to CfP for Technology Solutions to Screen Digital Audio Content for LCM Acceptance, SDMI, PDWG Tokyo, May 23, 1999, 9 pages.

Response to CfP for Technology Solutions to Screen Digital Audio Content for LCM Acceptance, NTT Waveless Radio Consotium, May 23, 1999, 9 pages.

Sandford II et al., "The Data Embedding Method", Proceedings of the SPIE vol. 2615, pp. 226–259, 1996.

Thomas, Keith, Screening Technology for Content from Compact Discs, May 24, 1999, 11 pages.

Tirkel et al., "Electronic Water Mark," Dicta–93, Marquarie University, Sydney, Australia, Dec., 1993, pp. 666–672.

Vidal et al., "Non–Noticeable Information Embedding in Color Images: Marking and Detection", IEEE 1999, pp. 293–297.

Wolfgang et al., "A Watermark for Digital Images," Computer Vision and Image Processing Laboratory, Purdue University, Sep. 1996, pp. 219–222.

U.S. Appl. No. 60/116,641, Cookson, filed Jan 21, 1999.
Cookson, Chris, General Principles of Music Uses on Portable Devices, presented to SDMI, Mar. 5, 1999.

Winograd, J.M., "Audio Watermarking Architecture for Secure Digital Music Distribution," a Proposal to the SDMI Portable Devices Working Group, by Aris Technologies, Inc., Mar. 26, 1999.

Mintzer et al., "Safeguarding Digital Library Contents and Users: Digital Watermarking," D–Lib Magazine, Dec. 1997, 12 pages.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Dautzenberg, "Watermarking Images," Department of Microelectronics and Electrical Engineering, Trinity College Dublin, 47 pages, Oct. 1994.

Szepanski, "Additive Binary Data Transmission for Video Signals," Conference of the Communications Engineering Society, 1980, NTG Technical Reports, vol. 74, pp. 343–351. (German text and English translation enclosed).

U.S. Appl. No. 60/000,442, Hudetz, filed Jun. 20, 1995.
U.S. Appl. No. 60/141,763, Davis, filed Jun. 30, 1999.
U.S. Appl. No. 60/158,015, Davis et al., filed Oct. 6, 1999.
U.S. Appl. No. 09/314,648, filed May 19, 1999, Rodriguez et al.
U.S. Appl. No. 09/342,688, filed Jun. 29, 1999, Rodriguez et al.

U.S. Appl. No. 09/342,971, filed Jun. 29, 1999, Rodriguez et al.
U.S. Appl. No. 09/679,261, filed Oct. 4, 2000, Davis et al.
U.S. Appl. No. 09/562,517, filed May 1, 2000, Davis et al.
U.S. Appl. No. 09/547,664, filed Apr. 12, 2000, Rhoads et al.
U.S. Appl. No. 09/571,442, filed May 15, 2000, Rhoads et al.
U.S. Appl. No. 09/858,189, filed May 14, 2001, Rhoads et al.
U.S. Appl. No. 09/631,409, filed Aug. 3, 2000, Brundage et al.
U.S. Appl. No. 09/452,021, filed Nov. 30, 1999, Davis et al.
U.S. Appl. No. 09/629,401, Aug. 1, 2000, Seder et al.
U.S. Appl. No. 09/473,396, filed Dec. 28, 1999, Evans et al.
U.S. Appl. No. 09/563,664, filed May 2, 2000, Levy et al.
U.S. Appl. No. 09/670,115, filed Sep. 26, 2000, Rhoads et al.
Brassil et al., Electronic Marking and Identification Techniques to Discourage Document Copying, Proceedings of INFOCOM '94 Conference on Computer, IEEE Commun. Soc Conference, Jun. 12–16, 1994, 1278–1287.
Bruckstein, A.M.; Richardson, T.J., A holographic transform domain image watermarking method, Circuits, Systems, and Signal Processing vol. 17, No. 3, p. 361–89, 1998. This paper includes an appendix containing an internal memo of Bell Labs, which according to the authors of the paper, was dated Sep. 1994.
"High Water FBI Limited Presentation Image Copyright Protection Software," FBI Ltd brochure, Jul., 1995, 17 pages.
Koch et al., "Copyright Protection for Multimedia Data," Fraunhofer Institute for Computer Graphics, Dec. 16, 1994, 15 pages.
Koch et al., "Towards Robust and Hidden Image Copyright Labeling, " Proc. of 1995 IEEE Workshop on Nonlinear Signal and Image Processing, Jun. 20–22, 1995, 4 pages.
Kurak et al., "A Cautionary Note On Image Downgrading," 1992 IEEE, pp. 153–159.

Mintzer et al., "Safeguarding Digital library Contents and Users" Digital Watermarking, D–Lib Magazine, Dec. 1997: ISSN 1082–9873.
Rindfrey, "Towards an Equitable System for Access Control and Copyright Protection in Broadcast image Services: The Equicrypt Approach," Intellectual Property Rights and New Technologies, Proc. of the Conference, R. Oldenbourg Verlag Wien Munchen 1995, 12 pages.
Schreiber et al., "A Compatible High–Definition Television System Using the Noise–Margin Method of Hiding Enhancement Information," SMPTE Journal, Dec. 1989, pp. 873–879.
SDMI Example Use Scenarios (Non–Exhaustive), Version 1.2, Jun. 16, 1999.
Szepanski, "A Signal Theoretic Method for Creating Forgery–Proof Documents for Automatic Verification," Proceedings 1979 Carnahan Conference on Crime Countermeasures, May 16, 1979, pp. 101–109.
Szepanski, "Additive Binary Data Transmission for Video Signals," Papers Presented at Conf. Of Comm. Engineering Soc. Sep. 30–Oct. 3, 1980, Technical Reports vol. 74, pp. 342–352.
Tanaka et al., "A Visual Retrieval System with Private Information for Image Database," Proceeding International Conference on DSP Applications and Technology, Oct. 1991, pp. 415–421.
Tanaka et al., "New Integrated Coding Schemes for Computer–Aided Facsimile," Proc. IEEE Int'l Conf. on Sys. Integration, Apr. 1990, pp. 275–281.
Tirkel et al, "Electronic Water Mark," DICTA–93, Macquarie University, Sydney, Australia, Dec., 1993, pp. 666–673.
Weber et al., "Correlative Image Registration," Seminars in Nuclear Medicine, vol. XXIV, No. 4, Oct., 1994, pp. 311–323.

* cited by examiner

DATA TRANSMISSION BY WATERMARK PROXY

RELATED APPLICATION DATA

This application is a continuation-in-part of application Ser. No. 09/491,534, filed Jan. 26, 2000, entitled Data Transmission by Watermark Proxy (now abandoned), which is a continuation-in-part of application Ser. No. 09/473,396, filed Dec. 28, 1999 entitled Watermark-Based Object Linking and Embedding (now U.S. Pat. No. 6,577,746, herein incorporated by reference). This application is also a continuation-in-part of copending application Ser. No. 09/476,686, filed Dec. 30, 1999, entitled Watermark-Based Personal Audio Appliance, the disclosure of which is attached as Appendix B. This application also claims the benefit of application Ser. No. 60/134,782, filed May 19, 1999, the disclosure of which is attached as Appendix C.

FIELD OF THE INVENTION

The present invention relates to data transmission, and more particularly relates to use of watermarks as proxies for data in transmission.

SUMMARY OF THE INVENTION

As detailed in the assignee's prior applications, including Ser. Nos. 60/134,782, 60/141,538, and Ser. No. 09/343,104, digital watermark technology has numerous applications beyond its traditional role of simply communicating copyright information. One futuristic view foresees that all "content" should be watermarked, thereby enabling a great variety of operations and transactions whenever watermarked content is processed by digital devices equipped with watermark recognition and reading technology. All physical media objects can thereby be inherently and persistently digitally-enabled, permitting greatly simplified access to networks and execution of local and remote applications. The continuing growth of the Internet and beginnings of trends toward pervasive computing signal an opportunity to radically change the relationships between traditional media content and digital processing environments.

In this specification, content refers not just to electronic audio, image, and video files, but also includes the content aspects of physical objects and media, e.g., artwork, patterns, and labels on product packaging, concert tickets, etc.

In accordance with a preferred embodiment of the present invention, the processing of watermark data as pointer to shared resources is sometimes used in lieu of transmitting from point to point the object with which it is associated, thereby gaining efficiencies in speed and bandwidth.

This and other features and advantages of the present invention will be more readily apparent from the following detailed description, which proceeds with reference to the accompanying drawings.

DETAILED DESCRIPTION

Figure 1:
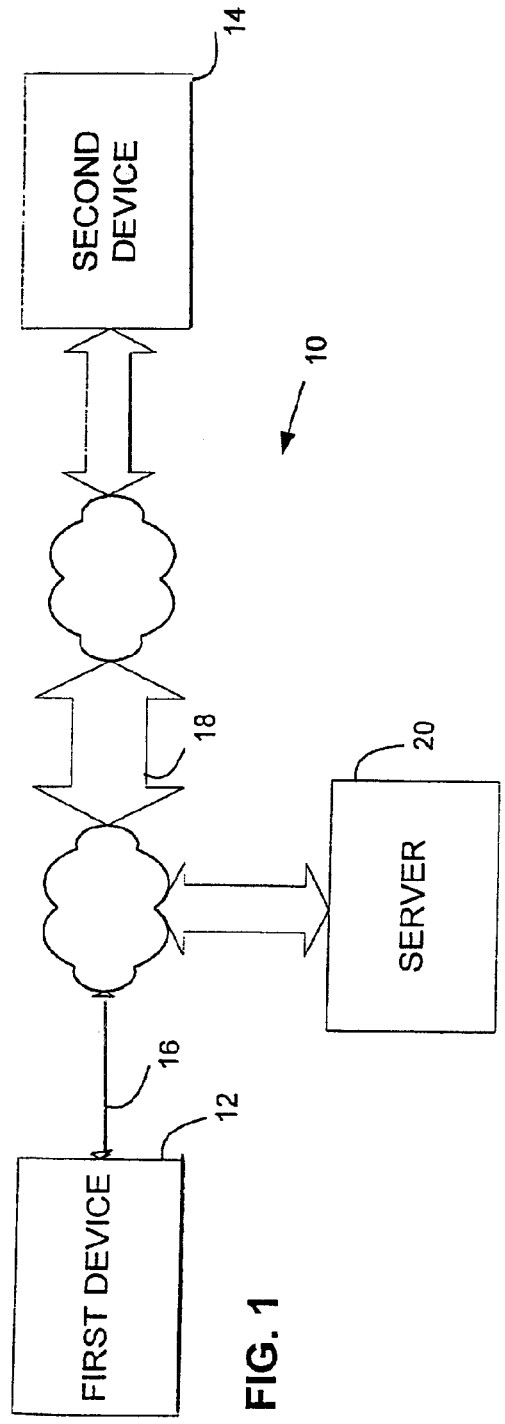
FIG. 1 is a diagram illustrating a network environment in which principles of the present invention may be employed.

Referring to FIG. 1, consider an exemplary network 10 linking two devices—a first device 12 associated with an originating user, and a second device 14 associated with a recipient user. The first device 12 is coupled to the network through a relatively low bandwidth channel, whereas the second device 14 is coupled to the network through a relatively high bandwidth channel. (For example, the first device may be an internet-capable cell phone having low resolution-, still image only-capture capabilities, providing a 9600 baud data channel, or it may be a home PC, with an associated PC or digital single shot camera, coupled to the Internet with a 28.8 kbps modem. The second device may be a computer coupled to the internet through a 1.45 megabit per second T-1 line, a cable modem, etc.) The network 10 connecting the two devices includes various links—narrow bandwidth at some parts (e.g., 16), very broadband at other (e.g., internet backbone 18), etc.

Assume the user of device 12 encounters a printed image, e.g., an advertisement in a magazine, that may be of interest to the user of device 12. Using an imaging device (e.g., a CMOS- or CCD-camera built into a cell phone, a flatbed scanner connected to a PC, etc.), device 12 captures an image of the advertisement.

In prior art techniques, the image captured by device 12 would have been sent to device 14 over the network; the image received by the second device would be exactly the image sent by the first device.

Figure 2:
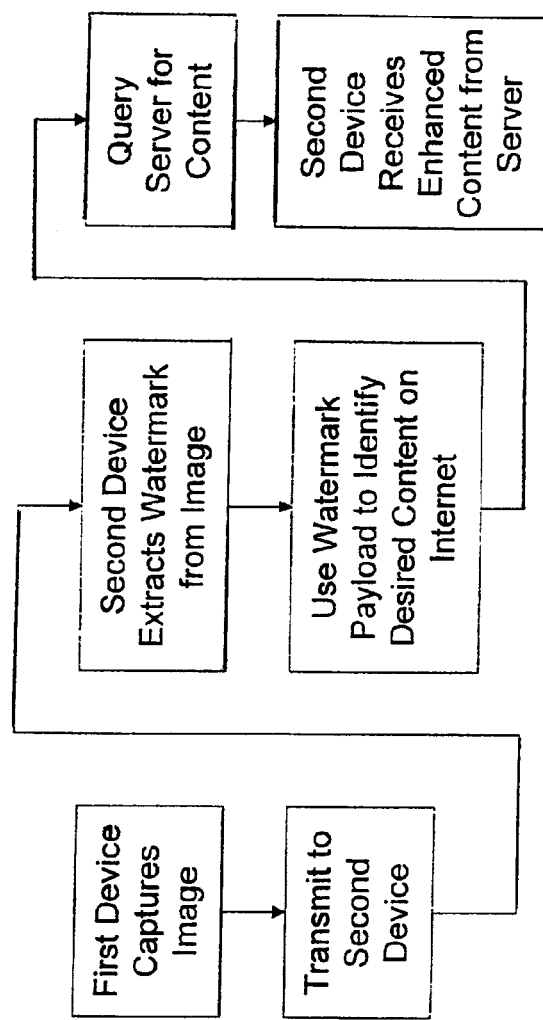
FIG. 2 is a flow chart illustrating aspects of one embodiment of the present invention.

In accordance with one embodiment of the invention, device 14 receives a better image than that sent from device 12. In one such embodiment, device 14 receives the image data captured by device 12. Device 14 recognizes that the image includes a watermark hidden within the image data, and decodes same. The watermark payload includes an index by which a copy of the image can be accessed from a server 20 on the internet or other storage medium. With this index, the second device 14 queries the server 20, which returns the image corresponding to this watermark index (in this case, the advertisement) back to the second device 14. The image provided by the server can be higher resolution or pristine, i.e., it has no artifacts left from scanning at device 12, etc. Such a procedure is shown by the flowchart of FIG. 2.

The watermark payload identifying the sensed image can as long or as short as the application requires. Typically, payloads of between 16 and 64 bits are used, although this is not essential. Shorter payloads have the advantage that they can be more robustly encoded while maintaining a fixed degree of image quality; longer payloads offer a greater universe of identifiers with which the image can be labeled. Illustrative watermarking technology is detailed in the assignee's U.S. Pat. No. 5,862,260, and in copending application Ser. No. 09/503,881, filed Feb. 14, 2000, entitled Watermark Embedder and Reader. A great variety of other watermarking arrangements may be used, including those proposed in U.S. Pat. Nos. 5,930,369, 5,933,798, 5,664,018, 5,825,892, 5,940,429 and 5,889,868.

Figure 3:
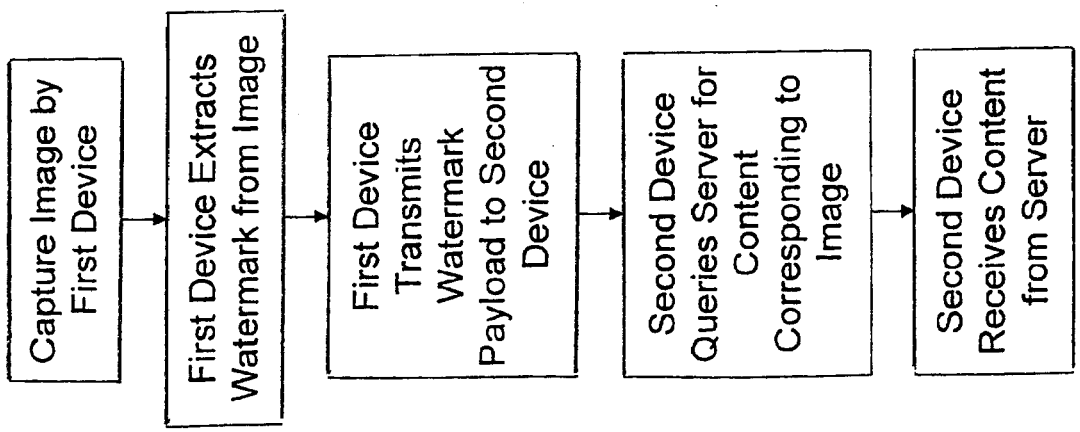
FIG. 3 is a flow chart illustrating aspects of another embodiment of the present invention.

In accordance with another embodiment of the invention (FIG. 3), the bandwidth bottleneck imposed by narrowband channel 16 (through which device 12 is coupled) is obviated by employing a watermark as a proxy for an image. In such an arrangement, the image data captured by device 12 is decoded, and a watermark payload hidden in the image is extracted. (This can be performed by hardware or software available in device 12, e.g., a cell phone microprocessor, a desktop computer, dedicated decoder circuitry, etc.

Alternatively, this decoding can be done remotely from device 12, but before device 14, e.g., by a smart router in the intervening network. In the following discussion, decoding in the device 12 is assumed.) Instead of transmitting the image data over the network, the watermark decoding device (e.g., device 12) simply transmits the watermark payload (or a part thereof). On receipt of the payload, device 14 again queries the server 20, and obtains the image (and/or additional content or functionality, as detailed below), corresponding to that watermark. The image is obtained over the high-speed channel(s) between the server and the second device; the low bandwidth channel linking the first device conveys just the low bandwidth watermark payload information.

By building filters into the low bandwidth devices, upon recognition of a class of watermarks indicating availability of the image as a shared resource, or upon user selection of "transmit only watermark data", the image [or content associated with it via the watermark] can be made available to the message recipient via more capable transmission means.

Figure 4:
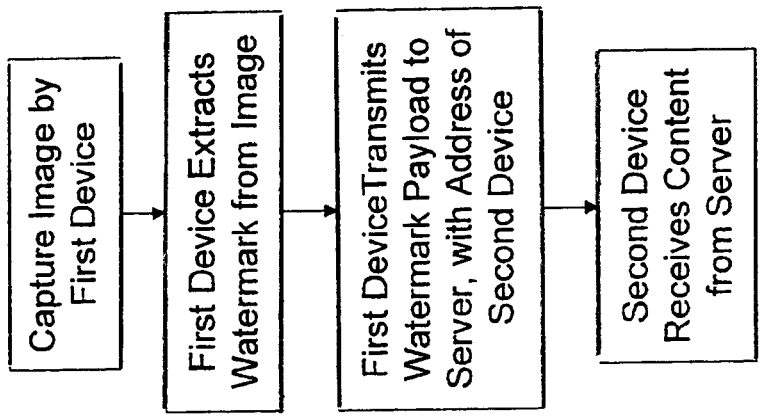
FIG. 4 is a flow chart illustrating aspects of yet another embodiment of the present invention.

A variant of the foregoing does not transmit the watermark payload to the second device 14. Instead, the payload is dispatched by the first device 12 (or the smart router) directly to the server 20, with instructions that the corresponding desired image be sent to the second device 14. Such an arrangement is shown in FIG. 4.

In some applications, the media delivered by the server may be richer than the simple image captured by device 12. For example, the watermark payload in the image captured by device 12 may index one or more files on server 20 that includes video, animation, sound, executable applications, aplets (e.g., JAVA, ActiveX) etc ("enhanced content"). Thus, scanning of a magazine ad at one device can prompt delivery of a video, a Macromedia ShockWave presentation, etc., to the second device.

In some embodiments, the second device 14 identifies to the server 20 its media-playback capabilities. The server 20 can then respond to a watermark-based query with media appropriate to that particular media consumer.

One way the media capabilities of device 14 can be indicated to server 20 is by a data word comprising flag bits, with each set "1" bit indicating a capability. A simplified 8-bit capability word may be as follows:

| Bit | Capability |
| --- | --- |
| 0 | GIF file display |
| 1 | TIFF file display |
| 2 | JPEG filed display |
| 3 | AVI movie display |
| 4 | WAV sound |
| 5 | RealAudio sound |
| 6 | MP3 sound |
| 7 | WindowsMedia |

The data comprising this word may be automatically compiled on device 14, e.g., from the operating system database with which programs are registered on installation (the Registry database in Windows).

If device 14 sends the capability word 10101100 to server 20, the server knows the device 14 supports GIF and JPEG imagery (but not TIFF), and RealAudio and WAV sound (but not MP3 or WindowsMedia).

If server 20 has media content corresponding to the queried watermark in several supported formats, it can deliver certain ones according to a priority order (e.g., send JPEG if supported; else send GIF if supported; else send TIFF if supported).

If the server 20 only has media in a format not supported by the second device 14 (e.g., TIFF in the foregoing example), the server may invoke a conversion routine to perform an on-the-fly conversion to a supported media type (e.g., JPEG) prior to sending to the second device 14.

If the watermark index is provided by the second device 14 (rather than directly from the first device 12), the capability data word can accompany the index.

If the watermark index is provided directly from the first device 12, the server can solicit from the second device 14 a data capability word before responding to the query. Alternatively, the server can keep, on-file, a database detailing the media capabilities of all known media consumers, and can tailor its query response according to such profile. (The second device 14 can be arranged to automatically inform server 20 of updates to its capability, e.g., each time a new media playback application is registered in the registry database.)

If the server 20 does not know, and cannot discern, the media capabilities of the second device 14, it can provide media in a default form that is most likely to be acceptable (e.g., JPEG, if the content captured by the first device 12 is imagery).

From the foregoing description, it will be apparent that embodiments of the present invention provide various advantages over the prior art. One is the dispatch of high bandwidth enhanced content using a low bandwidth channel. Another is the receipt of higher-quality data than that originally captured. Another is delivering applications via low bandwidth channels to recipients by capturing images or watermark data from media content that serve as proxies for the applications.

Having described and illustrated the principles of our invention with reference to a specific embodiment, it will be recognized that the principles thereof can be implemented in other, different, forms.

For example, while the invention has been described with reference to images, the same principles are equally applicable to video and audio.

Similarly, while the foregoing description has made reference to transmitting the watermark, in many implementations only a part of the watermark need be transmitted. (The watermark may include error correcting information, or other data, not necessary to identify the corresponding data on the server 20.)

Still further, while the detailed embodiment contemplated a still or video camera system for first device 12, much of the functionality of such an image capture system isn't essential to the present invention. Instead, an input device that serves a simpler "watermark capture" function may be used instead. Such a device can omit, e.g., hardware or software components associated with pixel interpolation (commonly used to achieve a desired virtual resolution), formatting (e.g., to provide output in JPEG form), etc. Such components serve useful functions when the resulting imagery is to be displayed or printed, but are superfluous—or detrimental—when the image data is simply to be decoded to extract watermark data.

While the invention is illustrated with reference to steganographic watermark technology for identifying the initial content (i.e., that sensed by device 12), other technologies can alternatively be used. These include data glyphs, 1- and 2-D barcodes, magnetic ink, RF ID tags, UV or IR markings, etc.

While the detailed embodiment contemplated a single server 20 to serve as the repository of content corresponding to watermarks, in other embodiments such a server is implemented in distributed fashion. In some embodiments, one server may act as a default repository, and can dispatch queries to other servers if the first server cannot provide the requested data. Caching of frequently-requested content can be provided at various locations through the network. Additional details on such network configurations can be found in application Ser. No. 09/343,104.

As is familiar to those skilled in the arts, the foregoing methods may be performed using dedicated hardware at devices 12, 14 and 20, and/or through use of processors programmed in accordance with firmware or software, etc. In the latter case the processors may each include a CPU and associated memory, together with appropriate input and output devices/facilities. The software can be resident on a physical storage media such as disks, and can be loaded into the processors' memory for execution. The software includes instructions causing the CPU to perform the various processes detailed above.

To provide a comprehensive disclosure without unduly lengthening this specification, applicant incorporates by reference the patents and applications cited above.

In view of the wide variety of embodiments to which the principles of our invention can be applied, it should be recognized that the detailed embodiments are illustrative only and should not be taken as limiting the scope of the invention. Rather, we claim as our invention all such embodiments as may come within the scope and spirit of the following claims, and equivalents thereto.

We claim:

1. A method comprising:
sensing a media object in human-perceptible form, and converting same to an electronic form, said sensing and converting being performed by a first device;
decoding object identification data from the electronic form, wherein the object identification data comprises plural-bit watermark data steganographically encoded within the sensed media object;
by reference to said object identification data, identifying a set of data stored in a repository at a remote site, the set of data comprising at least one media content file; and
sending said set of data from said repository, wherein the media content file represents the same media object as originally sensed, but represented with higher fidelity or accuracy.

2. The method of claim 1 in which:
the media object comprises a graphic on a printed page; and
the sending comprises sending the set of data to a second device remote from the first device.

3. A method comprising:
sensing a media object in human-perceptible form, and converting same to an electronic form, said sensing and converting being performed by a first device;
decoding object identification data from the electronic form, wherein the object identification data comprises plural-bit watermark data steganographically encoded within the sensed media object;
by reference to said object identification data, identifying a set of data stored in a repository at a remote site, the set of data comprising at least one media content file; and
sending said set of data from said repository, wherein the decoding is also performed by said first device, and the method includes sending at least a part of the watermark data from the first device.

4. The method of claim 3 which includes sending at least a part of the watermark data to a second device, the second device being remote from the first device.

5. The method of claim 4 in which the data repository comprises the second device.

6. A method comprising:
sensing a media object in human-perceptible form, and converting same to an electronic form, said sensing and converting being performed by a first device;
decoding object identification data from the electronic form, the object identification data comprising plural-bit watermark data steganographically encoded within the sensed media object, wherein the decoding is performed by the first device;
sending at least a part of the watermark data from the first device to a data repository, the data repository being remote from the first device;
by reference to said object identification data, identifying a set of data stored in the data repository, the set of data comprising at least one media content file; and
sending a destination identifier to the data repository from the first device, the data repository thereafter sending the set of data in accordance with said destination identifier.

7. A method comprising:
sensing a media object in human-perceptible form, and converting same to an electronic form, said sensing and converting being performed by a first device;
decoding object identification data from the electronic form, the object identification data comprising plural-bit watermark data steganographically encoded within the sensed media object, wherein the decoding is performed by said first device;
sending at least a part of the watermark data from the first device to a second device, the second device being remote from the first device;
from the second device, accessing a data repository by use of the at least a part of the watermark data, wherein the second device is distinct from the data repository;
by reference to said object identification data, identifying a set of data stored in the data repository, the set of data comprising at least one media content file;
sending said set of data from said data repository; and
receiving at the second device, the set of data from the data repository.

8. The method of claim 7 which includes transmitting capability data from the second device to the repository, the capability data indicating the type(s) of media acceptable to the second device, and sending from the repository to the second device one of said types of media corresponding to said watermark data.

9. A method comprising:
sensing a media object in human-perceptible form, and converting same to an electronic form, said sensing and converting being performed by a first device;
decoding object identification data from the electronic form, the object identification data comprising plural-bit watermark data steganographically encoded within the sensed media object, wherein the decoding is performed by said first device;
sending at least a part of the watermark data from the first device to a second device, the second device being remote from the first device and being distinct from a data repository at a remote site;

by reference to said object identification data, identifying a set of data stored in the data repository at the remote site, the set of data comprising at least one media content file; and sending said set of data from said data repository.

10. The method of claim 1 in which the decoding is performed by a second device remote from the first device.

11. A method comprising:

sensing a media object in human-perceptible form, and converting same to an electronic form, said sensing and converting being performed by a first device;

sending the electronic form of the media object to a second device remote from the first device;

decoding object identification data from the electronic form, the object identification data comprising plural-bit watermark data steganographically encoded within the sensed media object, the decoding being performed by the second device;

using at least part of said watermark data to access a data repository at a remote site;

by reference to said object identification data, identifying a set of data stored in the data repository at the remote site, the set of data comprising at least one media content file;

sending said set of data from said data repository; and receiving, at the second device, the set of data from said data repository.

12. The method of claim 11 in which the data repository comprises the second device.

13. The method of claim 11 in which the data repository is distinct from the second device.

14. The method of claim 1 which includes sending the set of data from the repository to a second device after decoding the watermark data at a third device distinct from the first and second devices.

15. The method of claim 1 in which the media object comprises audio.

16. A method of invoking delivery of a set of data from a repository to a destination that includes:

sensing a media object in human-perceptible form, and converting same to an electronic form, said sensing and converting being performed by a first device;

decoding object identification data from the electronic form, wherein the object identification data comprises plural-bit watermark data steganographically encoded within the sensed media object; and transmitting at least some of said decoded object identification data, without transmitting said electronic form, so as to invoke delivery of the set of data from the repository to the destination.

17. A computer storage medium having stored thereon instructions causing a computer to perform the method of claim 16.

18. The method according to claim 6, wherein the destination identifier is sent with the at least a part of the watermark data.

19. The method according to claim 6, wherein the set of data is sent from the data repository to a second device, wherein the second device is remote from both the first device and the data repository.

20. The method of claim 9, wherein the set of data is sent from the repository to the second device.

21. The method of claim 16, wherein the repository communicates with a network, and wherein the first device communicates with the network through a relatively low bandwidth channel, and the destination communicates with the network through a relatively high bandwidth channel, the destination being distinct from the first device.

22. The method of claim 16 wherein the decoded object identification data is transmitted from the first device to the repository with instructions to invoke delivery of the data set from the repository to the destination.

23. The method of claim 22, wherein the instructions include an address of the destination.

24. The method of claim 16 wherein the decoded object identification data is transmitted from the first device to the destination, and the destination communicates instructions to the repository to invoke delivery of the data set from the repository to the destination.

25. The method of claim 24, in which the decoding is performed by the destination.

26. The method of claim 16 which includes sending the set of data from the repository to a second device after decoding the watermark data at a third device which is distinct from the first and second devices, wherein the destination comprises the second device.

27. A method of invoking delivery of audio or imagery content from a repository to a destination, said method comprising:

sensing media in human-perceptible form, and converting same to an electronic form, said sensing and converting being performed by a first device;

decoding object identification data from the electronic form, wherein the object identification data comprises plural-bit data steganographically encoded within the sensed media; and transmitting at least some of said decoded object identificaiton data, without transmitting said electronic form, so as to invoke delivery of imagery content from the repository to the destination.

28. The method according to claim 27, wherein the audio or imagery content is sent from the data repository to a second device, wherein the second device is remote from both the first device and the repository.

29. The method of claim 27 wherein the first device comprises a cell phone.

30. The method of claim 27 wherein the audio or imagery content comprises enhanced content relative to the media.

31. The method of claim 27 wherein the repository receives information indicating which type of audio or imagery content is suitably renderable by receiving device, and tailors delivery of audio or imagery content in accordance therewith.

32. The method of claim 31, wherein the audio or imagery content is to sent from the data repository to a second device, wherein the second device is remote from bothe the first device and the repository, and wherein the repository receives information indicating which type of audio or imagery content is suitably renderable by the second device, and tailors delivery of audio or imagery content in accordance therewith.

33. The method of claim 32, wherein the information is transmitted to the repository from the second device.

34. The method of claim 31, wherein the information is transmitted to the repository from the first device.

35. The method of claim 31 wherein the information is received in response to an inquiry made by the repository.

36. The method of claim 27 wherein the repository communicates with a network, and wherein the first device communicates with the network through a relatively low bandwidth channel, and the destination communicates with the network through a relatively high bandwidth channel, the destination being distinct form the first device.

* * * * *

UNITED STATES PATENT AND TRADEMARK OFFICE
CERTIFICATE OF CORRECTION

PATENT NO. : 6,965,682 B1
APPLICATION NO. : 09/504239
DATED : November 15, 2005
INVENTOR(S) : Davis et al.

It is certified that error appears in the above-identified patent and that said Letters Patent is hereby corrected as shown below:

Title Page, add item --73) Assignee: Digimarc Corporation, Beaverton, OR (US)--.

Title Page, Page 1, Related U.S. Application Data item (63), lines 2-5, change "which is a continuation-in-part of application No. 09/476,686, filed on December 30, 1999, and a continuation-in-part of application No. 09/473,396, filed on December 28, 1999, now Pat. No. 6,577,746" to --which is a continuation-in-part of application No. 09/473,396, filed on December 28, 1999, now Pat. No. 6,577,746. Present application is also a continuation-in-part of application No. 09/476,686--.

Page 1, Column 1, under References Cited, add an asterisk to the following patents:
  3,493,674
  3,585,290 through 3,809,806

Page 1, Column 2, under References Cited, add an asterisk to the following patents:
  3,838,444 through 3,982,064
  4,025,851
  4,184,700
  DE 3806411
  DE 19521969
  EP 366381
  EP 372601

Page 2, U.S. Patent Documents, insert --4,380,027 A 4/1983 Leventer et al--.

UNITED STATES PATENT AND TRADEMARK OFFICE
CERTIFICATE OF CORRECTION

PATENT NO. : 6,965,682 B1
APPLICATION NO. : 09/504239
DATED : November 15, 2005
INVENTOR(S) : Davis et al.

It is certified that error appears in the above-identified patent and that said Letters Patent is hereby corrected as shown below:

Page 2, Column 1, under References Cited, add an asterisk to the following patents:

4,225,967

4,231,113

4,252,995

4,262,329

4,389,671

4,416,001

4,423,415

4,476,468

4,532,508

4,553,261 through 4,595,950

4,637,051 through 4,665,431

4,677,435 through 4,723,149

4,765,656 through 4,805,020

4,811,357 through 4,835,517

4,864,618 through 4,876,617

4,884,139

4,885,632

4,903,301

4,918,484 through 4,943,976

Page 2, Column 2, under References Cited, add an asterisk to the following patents:

4,963,998 through 4,967,723

4,972,471

4,972,475

UNITED STATES PATENT AND TRADEMARK OFFICE
CERTIFICATE OF CORRECTION

| | | |
|---|---|---|
| PATENT NO. | : 6,965,682 B1 | Page 3 of 8 |
| APPLICATION NO. | : 09/504239 | |
| DATED | : November 15, 2005 | |
| INVENTOR(S) | : Davis et al. | |

It is certified that error appears in the above-identified patent and that said Letters Patent is hereby corrected as shown below:

4,979,210 through 5,010,405

5,034,982

5,036,513

5,063,446 through 5,091,966

5,113,437

5,128,525

5,144,660

5,148,498 through 5,168,147

5,185,736

5,199,081

5,212,551

5,228,056

5,243,411

5,245,165 through 5,257,119

5,267,334

5,293,399

5,299,019

5,305,400

5,319,453 through 5,319,735

5,325,167

5,327,237

Page 3, Column 1, under References Cited, add an asterisk to the following patents:

5,337,362 through 5,371,792

5,387,941 through 5,408,542

UNITED STATES PATENT AND TRADEMARK OFFICE
CERTIFICATE OF CORRECTION

| | | |
|---|---|---|
| PATENT NO. | : 6,965,682 B1 | Page 4 of 8 |
| APPLICATION NO. | : 09/504239 | |
| DATED | : November 15, 2005 | |
| INVENTOR(S) | : Davis et al. | |

It is certified that error appears in the above-identified patent and that said Letters Patent is hereby corrected as shown below:

5,418,853 through 5,428,606

5,432,542 through 5,461,426

5,473,631 through 5,481,294

5,488,664

5,499,294

5,515,081

5,524,933

5,530,751

5,532,920 through 5,568,179

5,568,570 through 5,579,124

5,582,103 through 5,590,197

5,602,920

Page 3, Column 2, under References Cited, add an asterisk to the following patents:

5,611,575

5,613,012

5,614,940

5,638,446

5,661,574

5,666,487

Page 4, Column 1, under References Cited, add an asterisk to the following patents:

6,024,287

6,188,787

6,243,480

UNITED STATES PATENT AND TRADEMARK OFFICE
CERTIFICATE OF CORRECTION

| | | |
|---|---|---|
| PATENT NO. | : 6,965,682 B1 | |
| APPLICATION NO. | : 09/504239 | |
| DATED | : November 15, 2005 | |
| INVENTOR(S) | : Davis et al. | |

It is certified that error appears in the above-identified patent and that said Letters Patent is hereby corrected as shown below:

6,301,360
    6,321,648
    6,321,981
    6,343,204
    6,359,985

Page 4, Column 1, delete "5,981,223 A 11/1999 Sathe et al."

Page 4, Column 2, under References Cited, add an asterisk to the following patent publications:
    2001/0017709
    2001/0024510
    2001/0026629
    2001/0030759
    2001/0053299 through 2002/003891
    2002/0018228
    2002/0051237

Page 4, Column 2, under References Cited, add an asterisk to the following foreign patent documents:
    EP 411 232 through EP 441 702
    EP 058 482 through EP 649 074
    EP 705 025
    EP 711061
    EP 1122939

UNITED STATES PATENT AND TRADEMARK OFFICE
CERTIFICATE OF CORRECTION

| PATENT NO. | : 6,965,682 B1 |
|---|---|
| APPLICATION NO. | : 09/504239 |
| DATED | : November 15, 2005 |
| INVENTOR(S) | : Davis et al. |

It is certified that error appears in the above-identified patent and that said Letters Patent is hereby corrected as shown below:

GB 2063018 through GB 2204984

JP 4-248771 through JP 8-30759

WO 89/08915

WO 93/25038

WO 95/10835 through WO 96/27259

WO 01/08405

Page 5, Column 1, Foreign Patent Documents, insert --WO WO98/20411 5/1998--.

Page 5, Column 1, under References Cited, add an asterisk to the following Other Publications:
 "Access Control and COpyright Protection for Images, WorkPackage 8: Watermarking," Jun. 30, 1995, 46 pages.
 "Access Control and COpyright Protection for Images, WorkPackage 3: Evaluation of Existing Systems," Apr. 19, 1995, 68 pages.

Page 5, Column 2, Burgett reference, change "passwork protected" to --password protected--.

Page 5, Column 2, Burgett reference, change "on IGD WWW site);" to --on IGD WWW site); received Sep. 18, 1995,--.

Page 5, Column 2, under References Cited, add an asterisk to every reference in the entire column of Other Publications.

UNITED STATES PATENT AND TRADEMARK OFFICE
CERTIFICATE OF CORRECTION

PATENT NO. : 6,965,682 B1
APPLICATION NO. : 09/504239
DATED : November 15, 2005
INVENTOR(S) : Davis et al.

It is certified that error appears in the above-identified patent and that said Letters Patent is hereby corrected as shown below:

Page 6, Columns 1 and 2, under References Cited, add an asterisk to every reference on entire page.

Page 6, Column 1, "dJain" reference, change "dJain" to --Jain--.

Page 6, Column 1, "Johnson" reference, change "Johnson, 'Steganography,'" to --Johhnson, Steganography,"--.

Page 7, Column 1, under References Cited, add an asterisk to the following references: First reference Simmons through Gruhl et al.

Page 7, Column 2, in "Response to CfP" citation, change "consotium" to --consortium--.

Column 1, lines 11-17, "This application is also a continuation-in-part of copending application Ser. No. 09/476,686, filed Dec. 30, 1999, entitled Watermark-Based Personal Audio Appliance, the disclosure of which is attached as Appendix B. This application also claims the benefit of application Ser. No. 60/134,782, filed May 19, 1999, the disclosure of which is attached as Appendix C." These two appendices are not present with the issued patent. Please attach Appendices B and C (appended hereto) to the issued patent.

Column 2, lines 45-46, change "image can as long" to --image can be as long--.

UNITED STATES PATENT AND TRADEMARK OFFICE
CERTIFICATE OF CORRECTION

PATENT NO.        : 6,965,682 B1
APPLICATION NO.   : 09/504239
DATED             : November 15, 2005
INVENTOR(S)       : Davis et al.

It is certified that error appears in the above-identified patent and that said Letters Patent is hereby corrected as shown below:

Column 8, lines 30-31, change "object identificaiton data" to --object identification data--.

Column 8, line 44, change "by receiving device" to --by a receiving device--.

Column 8, line 48, change "content is to sent" to --content is sent--.

Column 8, line 57, change "The method of claim 31" to --The method of claim 32--.

Column 8, line 65, change "form the first device" to --from the first device--.

Signed and Sealed this

Fourteenth Day of April, 2009

JOHN DOLL
*Acting Director of the United States Patent and Trademark Office*